United States Patent
Schnell

[15] 3,667,564
[45] June 6, 1972

[54] TRANSPORTING APPARATUS
[72] Inventor: Gerhard Schnell, Stuttgart, Germany
[73] Assignee: Robert Bosch GmbH, Stuttgart, Germany
[22] Filed: Nov. 4, 1970
[21] Appl. No.: 86,686

[30] Foreign Application Priority Data
Nov. 6, 1969   Germany ..................... P 19 55 837.3

[52] U.S. Cl. .............................................. 180/79.1, 180/98
[51] Int. Cl. ....................................................... B62d 5/04
[58] Field of Search ............ 180/1 AW, 1 B, 79, 79.1, 79.2 C, 180/98; 280/47.13, 91

[56] References Cited

UNITED STATES PATENTS

| | | | |
|---|---|---|---|
| 2,305,578 | 12/1942 | Ulinski | 180/79.1 |
| 2,455,133 | 11/1948 | Moffat | 180/1 B |
| 3,322,225 | 5/1967 | Kohls | 180/79.1 |

Primary Examiner—Benjamin Hersh
Assistant Examiner—Leslie J. Paperner
Attorney—Michael S. Striker

[57] ABSTRACT

A vehicle from one of whose longitudinally spaced ends a lifting fork projects which is movable between a raised and a lowered position. A ground-engaging steering wheel is provided in the region of the other end of the vehicle and pivotable about an upright axis, and supporting wheels turnably mounted in the region of the fork and displaceable to and from a ground-engaging position. Auxiliary steering wheels are also provided in the region of the fork and displaceable to and from a ground-engaging position as well as pivotable about auxiliary upright axes. Means is provided for effecting displacement of the support wheels to, and at the same time of the auxiliary steering wheels from the respective ground-engaging position when the fork moves to raised position, and vice versa.

14 Claims, 7 Drawing Figures

INVENTOR
Gerhard SCHNELL

BY his ATTORNEY

INVENTOR
Gerhard SCHNELL
BY his ATTORNEY

INVENTOR
Gerhard SCHNELL
BY his ATTORNEY

TRANSPORTING APPARATUS

BACKGROUND OF THE INVENTION

The present invention relates generally to a transporting apparatus, and more particularly to a transporting apparatus utilizing a fork lift vehicle which is caused to move in a predetermined path along a current-conductor whose magnetic field is sensed by sensing means on the vehicle.

The use of such remote-controlled, as opposed to operator-controlled, transporting apparatus is becoming more and more prevalent, for instance in factories where the movement of goods, parts and the like is being increasingly automated. It is known from the art to provide such systems wherein the path or the paths along which the vehicles are to travel as they carry loads or move to pick up loads, are defined by conductors which are positioned on the ground, embedded in the ground or perhaps even mounted above the ground and which are supplied with alternating current. The vehicles themselves carry sensing means operating on the induction principle and controlling the steering of the vehicle in response to sensing of the magnetic field which exists in the conductor, and in a sense making the vehicle follow the conductor and thereby the required path. However, although in some respects these known approaches are satisfactory, in other respects they are not. For instance, it is quite often necessary for the vehicle to move backwards for certain reasons, such as to approach a loading or unloading station located adjacent the predetermined path. For a variety of reasons vehicles which are automatically controlled in this manner are of the three-wheeled type, that is at the end which normally is the leading end as the vehicle travels forwardly a single wheel is provided which is pivotable about an upright axis and which provides for the steering of the vehicle, whereas at the normally trailing end two wheels are provided which are not pivotable. The term "wheels" as herein noted, is intended to apply also to rollers, especially in view of the fact that all wheels of such vehicles are frequently in form of rollers with the single steerable one often having a fairly substantial axial length.

Keeping the arrangement of the steerable and non-steerable rollers or wheels in mind, it will be appreciated that when the vehicle moves backwardly, in which case it is the steerable wheel or roller which is trailing, a precise guidance of the vehicle is often difficult if not entirely impossible. This is highly disadvantageous, especially when the vehicle moves backwards in a non-linear path, a condition which for instance occurs if the vehicle is required to back up to a loading or unloading station which is located adjacent to the normal path of travel but which can be reached only if the vehicle deviates from the path and moves from the latter to the loading or unloading station at an angle to the path. Frequently, a load carried by the vehicle must be deposited at such a station in a precise spot, or conversely a load already positioned at the station must be engaged by the vehicle by manipulating the latter in such a way that the tines of its lifting fork move under the load in proper centered relationship. This is made very difficult if not impossible in the known transporting apparatus of the type under discussion.

SUMMARY OF THE INVENTION

It is, accordingly, an object of the present invention to overcome the aforementioned disadvantages.

More particularly it is an object of the present invention to provide a transporting apparatus wherein the vehicle can be precisely guided not only during forwards movement but also during backwards movement.

In pursuance of the above objects, and others which will become apparent hereafter, one feature of the invention resides in a transporting apparatus which, briefly stated, comprises a vehicle having longitudinally spaced ends and a load-supporting unit on the vehicle movable between a raised and a lowered position and projecting substantially horizontally from one of the ends. The unit has a terminal portion remote from the vehicle. A ground-engaging steering wheel is provided in the region of the other of the ends and pivotable about an upright axis, and supporting wheels are turnably mounted in the region of the terminal portion of the unit and displaceable to and from a ground-engaging position. Auxiliary steering wheels are provided in the region of the one end also displaceable to and from a ground-engaging position and pivotable about respective auxiliary upright axis. Finally, I further provide means for effecting displacement of the support wheels to, and of the auxiliary steering wheels from the respective ground-engaging position in response to movement of the unit to raised position, and vice versa.

Thus, when the vehicle travels in one position in which the load-supporting unit, that is the lifting fork, will be in raised position, the supporting wheels will be engaged with the ground and roll along the same, with steering of the vehicle being effected by the steering wheel provided in the region of the other end, that is the forward end of the vehicle. Conversely, if the vehicle is to back up, the supporting wheels are moved out of ground-engaging position and at the same time the auxiliary steering wheels are moved into ground-engaging position. Now it is the ground-engaging single steering wheel which performs the function previously performed by the supporting wheels and which is now in a trailing location with respect to the movement of the vehicle, whereas steering of the vehicle is effected by the auxiliary steering wheels which are in leading position with respect to the (backward) movement of the vehicle. Of course when the movement is reversed, a reversal of the positioning of the supporting wheels and auxiliary steering wheels again takes place.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
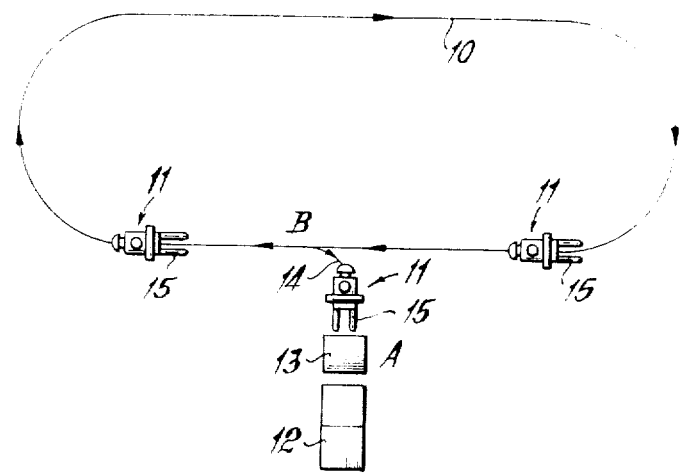
FIG. 1 is a diagrammatic plan view showing a transporting apparatus embodying the invention.

Discussing firstly the FIG. 1 of the drawing, it will be seen that reference numeral 10 identifies an elongated conductor such as wire or the like which in this case is in form of a continuous loop, embedded in the ground, positioned on the ground or possibly mounted above the ground. In any case, the transporting apparatus additionally comprises vehicles which are here illustrated as fork-lift vehicles 11 travelling along the conductor 10 in a predetermined path defined by the conductor 10, the direction of travel being indicated by the arrowheads. Laterally of the conductor 10 are provided loading and unloading stations, one of which is shown by way of example and identified with reference numeral 12. At these stations loads are to be deposited and/or picked up by the vehicles 11, and in the illustrated embodiment these loads will be discussed hereafter as pallets 13. Reference character A identifies a fixed spot at or adjacent the station 12 where the pallets 13 are to be deposited or picked up by the vehicles 11, as the case may be.

A consideration of FIG. 1 will readily indicate that for the vehicles 11, whose lifting fork is in trailing position when the vehicles move in forward direction along the path defined by the conductor 10, must first advance along the conductor 10 in forward direction approximately to the spot B, and then must back up along the branch conductor 14 in order to reach the spot A. They cannot move forwardly to the spot A because in that case the lifting fork would point away from this spot and it would be impossible to deposit or pick loads up at this spot A.

Figure 2:
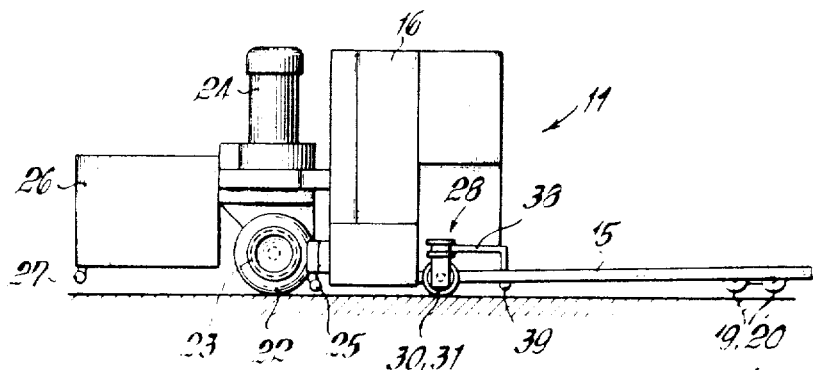
FIG. 2 is a diagrammatic side-elevational view illustrating one of the vehicles of the transporting apparatus in FIG. 1 with the lifting fork in lowered position.
Figure 3:
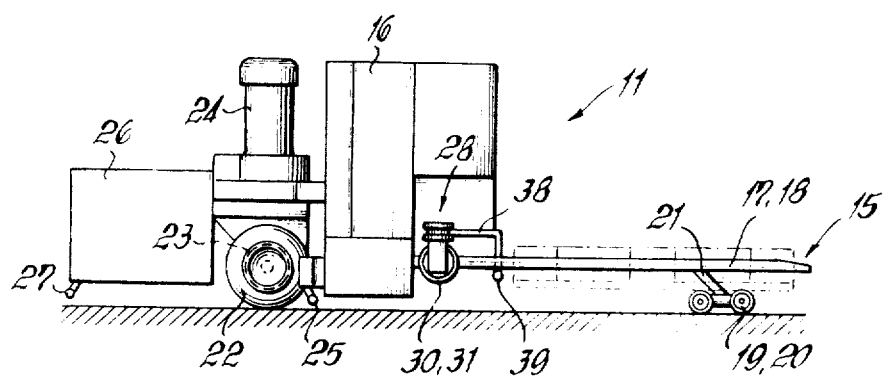
FIG. 3 is a view similar to FIG. 2 but showing the lifting fork in raised position.

When the vehicle has reached the spot A, and assuming that one or more pallets 13 are to be picked up by the lifting fork 15 of the vehicle 11, the tines of the fork 15 are moved beneath the pallets 31 and the fork is then moved from its lowered position to raised position, with the former illustrated in FIG. 2 and the latter illustrated in FIG. 3. Now the vehicle can move forwardly again, first along the branch conductor 14 and then along the conductor 10.

Figure 4:
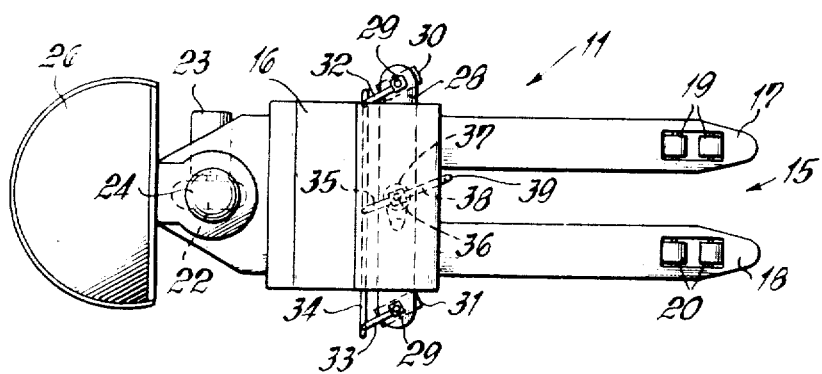
FIG. 4 is a top-plan view of the vehicle in FIGS. 2 and 3, showing the steering mechanism in diagrammatic form.

In order to permit precise steering of the vehicle 11 as it moves from the spot B to the spot A, the present invention is provided as illustrated in an exemplary embodiment in the vehicle shown in FIGS. 2–4. Reference numeral 16 identifies a chassis from one end of which projects the lifting fork 15 in substantially horizontal direction. FIG. 2 shows the fork 15 in lowered position in which the ends 17 and 18 of its tines can be inserted beneath the load, for instance the pallet 13 as shown in FIG. 4. Once this is done, the fork 15 is moved to raised position as shown in FIG. 3, thereby lifting the load engaged by the tines.

Wheels or rollers 19 and 20 are provided at the ends 17 and 18 mounted on the pivotable member 21 and engaging and rolling along the ground when the fork 15 is in the raised position shown in FIG. 3. When the fork is in the lowered position shown in FIG. 1, however, the wheels or rollers 19 and 20 are raised out of ground-engaging position as shown in FIG. 2. The pivoting of the lever 21 carrying the wheels or rollers 19 and 20 is controlled, simultaneously with the displacement of the fork 15 between its raised and lowered positions, by a non-illustrated lifting device for the fork 15.

At the leading end of the vehicle, that is the end which normally faces forwardly in the direction of movement, there is provided a drive and steering roller or wheel 22 which is driven in rotation by a diagramatically illustrated drive 23 which may utilize an electromotor or a combustion engine, for instance. As the drawing shows, the roller 22 is pivotable about an upright axis about which it can be turned by a control motor 24 whereby pivoting of the ground-engaging steering roller or wheel 22 serves for steering of the vehicle when the latter moves in forward direction following the arrows shown in FIG. 1. In the vicinity of the roller 22 is provided a sensing coil 25, whereas an additional sensing coil 27 is mounted on a protective member 26 located forwardly, in the direction of forward movement of the vehicle, of the roller 25. The two coils 25 and 27 operate on the inductive principle and sense the magnetic field which develops in the conductor 10 which is supplied with alternating current. The voltages induced in the coils 25 and 27 in response to such sensing are supplied to a control device of known construction mounted on the chassis 16 and which supplies the steering motor 24 with impulses causing it to pivot the wheel or roller 22 about the upright axis either to the left or to the right, thereby causing the vehicle to follow the path defined by the conductor 10. Such coils and control devices are already known in the art and are therefore not believed to require further detailed disclosure.

The further coil 39 is mounted between the tines 17 and 18 of the fork 15 and performs the same function as the coils 25 and 27, with the voltage induced in it being also supplied to the control device. However, the coil 39 is connected with the control device only when the auxiliary steering wheels or rollers 30 and 31 have descended to ground-engaging position and when accordingly the steering of the vehicle takes place by means of the auxiliary steering wheels 30 and 31, and not by means of the steering wheel 22. Advantageously the coil 39 is mounted on a pivotable supporting rod 38 which pivotably connected with a turnable projection or pin 36.

The drawing shows, especially in FIG. 4, that the auxiliary steering wheels 30 and 31 are mounted on the vehicle 11 by means of a supporting element 28 mounted on and extending transversely of the fork 15. The element 28 is provided with pins or shafts 29 which are each turnable about an auxiliary upright axis and on which the rollers or wheels 30 and 31 are respectively mounted, so as to be turnable with the shafts 29 and also to be turnable about horizontal axis with reference to the shafts 29. The pivoting of the shafts 29 is effected simultaneously and in one and the same direction by virtue of the fact that they are connected with rods or arms 32 and 33, the connection being rigid so that as the arms 32 and 33 are moved, the shafts 29 will pivot about the respective upright auxiliary axis. The arms 32 and 33 in turn are movably connected with a transverse rod 34 to which there is mounted in turnable relationship a linkage rod 35 which is connected at its other end with the turnable pin 36 provided on a disk 37 which can be turned by the steering motor 24.

It will be clear that when the steering motor directs right or left turning of the disk 37, in dependence upon signals received from the coil 39 as the vehicle moves backwardly, the shafts 29 are similarly turned in the corresponding direction, and the rollers 30 and 31 accordingly perform a steering function. Blocking means is advantageously provided which blocks the pivoting of the steering wheel 22 about its upright axis in response to the auxiliary steering wheels 30 and 31 moving to ground-engaging position, and the blockage must be such that the axis of rotation of the steering wheel 22 extends transversely to the longitudinal axis of the vehicle 11. The steering wheel 22 thus performs the same function as the supporting wheels 19 and 20 previously performed, that is it performs the same function when the vehicle backs up, while the auxiliary steering wheels 30 and 31 have taken over the steering function previously performed by the wheel 22. Because of the connection of the supporting rod 38 with the pin 36, the supporting rod 38 and accordingly the spool 39 carried by it, is pivoted at the same time as and together with the auxiliary steering wheels 30 and 31, so that the coil 39 will always remain in sufficient proximity to the conductor 10 or the conductor 14.

It will be appreciated that as the vehicle reaches the point B in FIG. 1, and its drive is reversed in suitable manner so that it backs up, the fork 15 moves from raised to lowered position and simultaneously the wheels 19 and 20 move upwardly out of ground-engaging position whereas the auxiliary steering wheels 30 and 31 move downwardly into ground-engaging position. At the same time pivoting of the wheel 22 about its upright axis is blocked, and because the auxiliary steering wheels 30 and 31 are provided, which in this direction of movement are the leading wheels, the vehicle can now be precisely steered irrespective of the complexity of the path which it must follow.

A further possibility for steering the vehicle 11 would provide separate steering motors (analogous to the steering motor 24) for the driven wheel 22 and for the auxiliary steering wheels 30, 31. In this case the steering control device would be connected with the coils 25, 27 and with that steering motor which controls the wheel 22, when the vehicle moves forwardly, and it would be connected with the coil 39 and with that steering motor which controls the auxiliary steering wheels 30, 31 when the vehicle moves backwardly.

It should be emphasized that although the present invention is of particular advantage and is discussed herein with respect to a transporting apparatus wherein the vehicle or vehicles will be guided by the magnetic field of the conductor 10, it has a wider scope of applicability inasmuch as it would be evidently suitable also for similar vehicles which are for instance operator-controlled, rather than being automatically controlled to follow a guide wire or conductor. Also it will be clear that the vehicles need not necessarily be of the type provided with lifting forks but could have other similarly displaceable components whose displacement would have the automatic consequence of resulting in displacement of the supporting wheels and auxiliary steering wheels in the manner described above.

Figure 5:
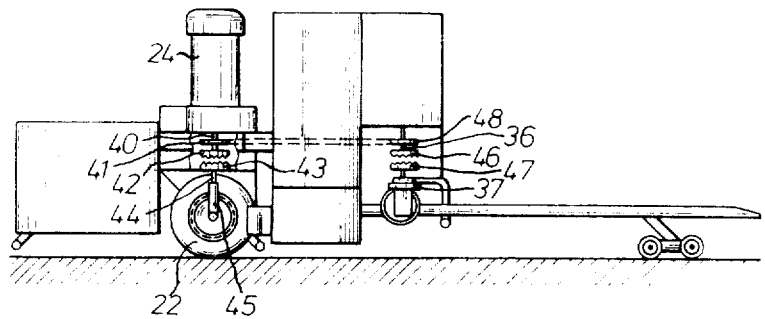
FIG. 5 is a view similar to but more detailed than that of FIG. 4, showing a further embodiment of the invention.

In the embodiment of FIG. 5 I have shown how a steering motor can be selectively coupled with either the auxiliary rollers or the main drive and steering roller. The motor is identified with reference numeral 24 and provided with an output shaft 40 on which there is mounted a pulley or sheave 41 and a spur gear 42. The latter cooperates with a second juxtaposed spur gear 43 which is mounted on a shaft 44. The shaft 44, in turn, is fast with a mounting bracket or the like 45 in which the main drive and steering wheel 22 is journalled.

Two further cooperating spur gears 46 and 47 are provided, with the former being mounted on the pin or shaft 36 which carries a pulley 48, and gear 47 being mounted on a carrier for the auxiliary rollers. A belt or the like, shown in chain lines, connects the pulleys 41 and 48.

When gears 42 and 43 are in mesh, turning of shaft 40 due to operation of motor 24 causes the wheel 22 to turn about its upright pivot axis for steering of the device with this wheel. Conversely, when the gears 42 and 43 are disengaged but the gears 46 and 47 mesh, the motor 24 turns the pin 36 via pulleys 41 and 48 and the belt, thereby turning the auxiliary rollers for steering purposes.

Figure 6:
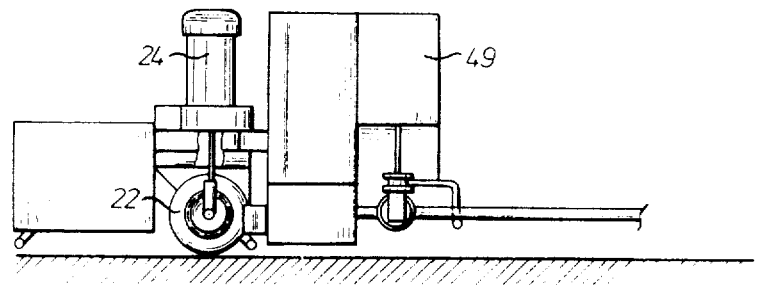
FIG. 6 is a view analogous to FIG. 5 but showing another embodiment of the invention.

FIG. 6 shows diagrammatically that, in accordance with a further embodiment, individual steering motors can be provided for wheel 22 and the auxiliary rollers. Motor 24 is associated with wheel 22 as before, but directly rather than via gears 42 and 43. A second motor 49 is similarly directly associated with the pin 36, and the motors 24 and 49 are selectively energized depending upon whether the vehicle is to be steered via wheel 22 or the auxiliary rollers.

Figure 7:
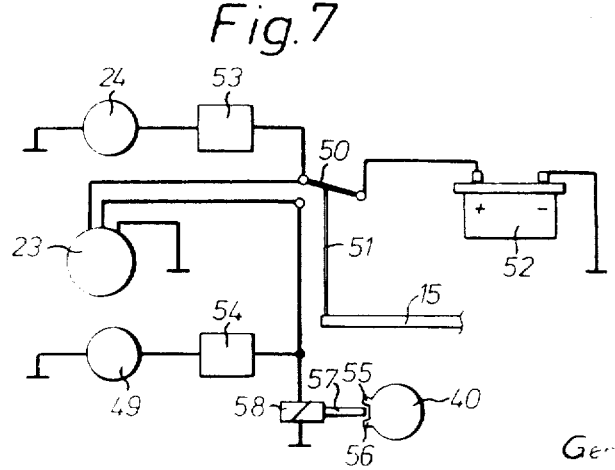
FIG. 7 is a circuit diagram, illustrating details of the control of a control circuit for use in accordance with the present invention.

In FIG. 7, finally, I have illustrated how the steering motors may be energized. Reference numeral 50 diagrammatically identifies a conventional selector switch which is connected with fork 15 (partially shown) via a linkage 51. Depending upon the position of fork 15, selector switch 50 is switched between two positions in which it electrically connects a battery 52 either with motor 24 or with motor 49. Boxes 53 and 54 diagrammatically indicate control units, known in the art and not specifically described because their construction is not part of the present invention, which determine the extent of angular displacement of wheel 22 or auxiliary rollers by governing the period of time for which the battery 52 remains connected with the respective motor 24 or 49.

If it is desired to block wheel 22 against movement about its upright pivot axis, when fork 15 is in lowered position and the auxiliary rollers serve to steer the vehicle, a blocking device (such as an electromagnetic device) may be provided which becomes activated in a position of selector switch 50 which the latter assumes when the fork moves to lowered position. FIG. 7 shows this diagrammatically by indicating the position of two projections 55 and 56 on the shaft 40 of motor 24, and an electromagnet 58 which, when energized, causes a blocking portion 57 to move between these projections 55 and 56 to thereby prevent the shaft 40 (about which the mounting carrier of wheel 22 pivots) from turning about its upright axis which should be understood to extend normal to the plane of FIG. 7.

For details concerning the general concept of controlling vehicles by a looped conductor cooperating with sensing means on the vehicles for sensing the magnetic field on the conductor, reference may be had to the currently copending U.S. Pat. applications Ser. Nos. 804,061, now U.S. Pat. No. 3,614,990 and 804,062 now abandoned.

It will be understood that each of the elements described above, or two or more together, may also find a useful application in other types of constructions differing from the types described above.

While the invention has been illustrated and described as embodied in a transporting apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims.

I claim:

1. In a transporting apparatus, in combination, a vehicle having longitudinally spaced ends; a load-supporting unit on said vehicle movable between a raised and a lowered position and projecting substantially horizontally from one of said ends, said unit having a terminal portion remote from said vehicle; a ground-engaging steering wheel provided in the region of the other of said ends and pivotable about an upright axis; supporting wheels turnably mounted in the region of said terminal portion and displaceable to and from a ground-engaging position; auxiliary steering wheels in the region of said one end also displaceable to and from a ground-engaging position and pivotable about respective auxiliary upright axes; and means for effecting displacement of said support wheels to, and of said auxiliary steering wheels from the respective ground-engaging position in response to movement of said unit to said raised position, and vice versa.

2. In a transporting apparatus as defined in claim 1; further comprising first prime mover means for driving said steering wheel in rotation; and second prime mover means for pivoting said steering wheel about said upright axis in a sense effecting steering of said vehicle.

3. In a transporting apparatus as defined in claim 1, said vehicle having a longitudinal axis coincident with its direction of travel; and further comprising blocking means for blocking pivotal movement of said steering wheel about said upright axis and for maintaining said steering wheel in a position in which its axis of rotation extends transversely to said longitudinal axis of said vehicle, when said unit is in said lowered position.

4. In a transporting apparatus as defined in claim 1; further comprising first motor means for driving said steering wheel in rotation; and second motor means for pivoting said steering wheel about said axis when said unit is in said raised position whereby said vehicle is steered by said steering wheel, and for pivoting said auxiliary steering wheels about said auxiliary axes when said unit is in said lowered position whereby said vehicle is steered by said auxiliary steering wheels.

5. In a transporting apparatus as defined in claim 4, said second motor means comprising one steering motor operatively associated with said steering wheel, and an other steering motor operatively associated with said auxiliary steering wheels; and steering control means for controlling operation of said one motor when said unit is in said raised position, and for controlling operation of said other motor when said unit is in said lowered position.

6. In a transporting apparatus as defined in claim 4, said second motor means comprising a single steering motor; and further comprising coupling means for coupling said steering motor with said steering wheel and said auxiliary steering wheels, respectively, in dependence upon the position assumed by said unit.

7. In a transporting apparatus as defined in claim 1; further comprising an elongated electrical conductor extending along and defining a predetermined path for said vehicle to follow; a source of alternate current connected with said conductor; and sensing means on said vehicle for sensing a magnetic field in said conductor, said sensing means being operative for controlling pivoting of the respective steering wheels in a sense causing said vehicle to follow said predetermined path.

8. In a transporting apparatus as defined in claim 7, said unit being a lifting fork having tines; and wherein said sensing means comprises a first sensing device in the region of said other end and operative for controlling pivoting of said steering wheel, and a second sensing device intermediate said tines and operative for controlling pivoting of said auxiliary steering wheels.

9. In a transporting apparatus as defined in claim 8, said sensing devices comprising sensing coils for sensing said magnetic field.

10. In a transporting apparatus as defined in claim 1, wherein said load-supporting unit is a lifting fork having tines.

11. In a transporting apparatus as defined in claim 10, comprising an elongated support on said fork extending transversely thereto, pivot pins mounting said auxiliary steering wheels on said support longitudinally spaced thereon and for pivoting movement about said auxiliary upright axes, and linkage means linking said pivot pins and operative for effecting their simultaneous angular displacement in identical directions.

12. In a transporting apparatus as defined in claim 11, said linkage means comprising a pair of levers each having one end rigid with one of said pivot pins, and an other end; and a cross-bar connecting said other ends.

13. In a transporting apparatus as defined in claim 12, further comprising steering motor means having a turnable shaft, and a linkage rod connected with said cross-bar and with said shaft for displacing the former in a sense effecting pivoting of said auxiliary steering wheels in response to turning of said shaft.

14. In a transporting apparatus as defined in claim 13; further comprising a disk-shaped member carried by and turnable with said shaft, and a connecting pin projecting from said disk-shaped member; and wherein said linkage rod is connected with said connecting pin.

* * * * *